United States Patent
Takemori et al.

(10) Patent No.: US 8,478,483 B2
(45) Date of Patent: Jul. 2, 2013

(54) SKID DETECTION APPARATUS FOR VEHICLE

(75) Inventors: Yuichiro Takemori, Wako (JP); Masatoshi Noguchi, Wako (JP); Yuzo Okubo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 320 days.

(21) Appl. No.: 12/910,563

(22) Filed: Oct. 22, 2010

(65) Prior Publication Data

US 2011/0106378 A1    May 5, 2011

(30) Foreign Application Priority Data

Oct. 30, 2009 (JP) ................................. 2009-251085

(51) Int. Cl.
*G06F 17/00* (2006.01)

(52) U.S. Cl.
USPC ............... 701/36; 701/51; 701/65; 701/69; 701/71; 701/74; 701/82; 180/415

(58) Field of Classification Search
USPC ............... 701/36, 51, 54, 65–66, 69–71, 74, 701/82, 90; 303/176; 180/22, 253, 411, 415
See application file for complete search history.

(56) References Cited

U.S. PATENT DOCUMENTS

| | | | |
|---|---|---|---|
| 4,733,878 A * | 3/1988 | Kanazawa et al. | 180/415 |
| 5,171,070 A * | 12/1992 | Okazaki et al. | 303/176 |
| 5,251,136 A * | 10/1993 | Fukuyama et al. | 701/38 |
| 5,599,075 A | 2/1997 | Hara et al. | |
| 2004/0059493 A1 | 3/2004 | Nagura et al. | |

FOREIGN PATENT DOCUMENTS

| | | |
|---|---|---|
| DE | 195 26 422 A1 | 2/1996 |
| DE | 197 30 325 A1 | 2/1998 |
| JP | 61-235235 A | 10/1986 |
| JP | 6-101513 A * | 4/1994 |
| JP | 7-280820 A | 10/1995 |
| JP | 10-253406 A | 9/1998 |
| JP | 2001-287561 A | 10/2001 |
| JP | 2007-092823 A | 4/2007 |

OTHER PUBLICATIONS

Notice of Allowance dated Feb. 1, 2012 issued in corresponding Japanese Application No. 2009-251085 with a Partial English-language Translation.

* cited by examiner

*Primary Examiner* — Gertrude Arthur Jeanglaude

(74) *Attorney, Agent, or Firm* — Arent Fox LLP

(57) ABSTRACT

In an apparatus for detecting a skid occurred on a four-wheel drive vehicle having a prime mover and a transmission, an actual rear right/left wheel speed ratio between the rear right/left wheel speeds is calculated based on detected front and rear wheel rotational speeds, a front/rear wheel slip ratio during grip-driving is calculated by retrieving characteristics of a front/rear wheel slip ratio set with respect to a rear right/left wheel speed ratio using the calculated actual rear right/left wheel speed ratio, an actual front/rear wheel slip ratio is calculated based on the detected front wheel rotational speed and the rear wheel rotational speed, and occurrence of skid is then determined based on a difference between the calculated front/rear wheel slip ratio during grip-driving and the calculated actual front/rear wheel slip ratio.

10 Claims, 5 Drawing Sheets

SKID DETECTION APPARATUS FOR VEHICLE

BACKGROUND OF THE INVENTION

1. Field of the Invention

This invention relates to a skid detection apparatus for a vehicle, particularly to an apparatus that detects a skid occurred on a four-wheel drive vehicle.

2. Description of the Related Art

In (not a four-wheel drive vehicle but) a two-wheel drive vehicle, a wheel skid is detected from a difference between average speed of front wheels and that of rear wheels, as taught, for example, by Japanese Laid-Open Patent Application No. 2007-92823.

SUMMARY OF THE INVENTION

The above technique can be useful to the skid detection of the two-wheel drive vehicle. However, it can not be applied to the case of skids of two wheels occurred on one side in the four-wheel drive vehicle, for instance, the case where a front left wheel and rear left wheel slip, while a front right wheel and rear right wheel grip the road.

An object of this invention is therefore to overcome the foregoing drawback by providing a skid detection apparatus for a vehicle that can accurately detect a skid occurred on a four-wheel drive vehicle.

In order to achieve the object, this invention provides in its first aspect an apparatus for detecting a skid occurred on a vehicle having a prime mover and a transmission that changes an output of the prime mover in speed and transmits the output to front right/left wheels and rear right/left wheels to drive them, comprising: a front/rear wheel rotational speed detector that detects each rotational speed of the front wheels and that of the rear wheels; an actual rear right/left wheel speed ratio calculator that calculates an actual rear right/left wheel speed ratio between the rear right/left wheel speeds based on the detected front wheel rotational speed and the rear wheel rotational speed; a grip-driving front/rear wheel slip ratio calculator that calculates a front/rear wheel slip ratio during grip-driving by retrieving characteristics of a front/rear wheel slip ratio set with respect to a rear right/left wheel speed ratio using the calculated actual rear right/left wheel speed ratio, which characteristics are calculated and prepared in advance based on assumption that the front and rear wheels grip a road; an actual front/rear wheel slip ratio calculator that calculates an actual front/rear wheel slip ratio based on the detected front wheel rotational speed and the rear wheel rotational speed; and a skid determiner that determines that a skid has occurred based on a difference between the calculated front/rear wheel slip ratio during grip-driving and the calculated actual front/rear wheel slip ratio.

In order to achieve the object, this invention provides in its second aspect a method of detecting a skid occurred on a vehicle having a prime mover and a transmission that changes an output of the prime mover in speed and transmits the output to front right/left wheels and rear right/left wheels to drive them, comprising the steps of: detecting each rotational speed of the front wheels and that of the rear wheels; calculating an actual rear right/left wheel speed ratio between the rear right/left wheel speeds based on the detected front wheel rotational speed and the rear wheel rotational speed; calculating a front/rear wheel slip ratio during grip-driving by retrieving characteristics of a front/rear wheel slip ratio set with respect to a rear right/left wheel speed ratio using the calculated actual rear right/left wheel speed ratio, which characteristics are calculated and prepared in advance based on assumption that the front and rear wheels grip a road; calculating an actual front/rear wheel slip ratio based on the detected front wheel rotational speed and the rear wheel rotational speed; and determining that a skid has occurred based on a difference between the calculated front/rear wheel slip ratio during grip-driving and the calculated actual front/rear wheel slip ratio.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A preferred embodiment of a skid detection apparatus for a vehicle according to the invention will now be explained with reference to the attached drawings.

Figure 1:
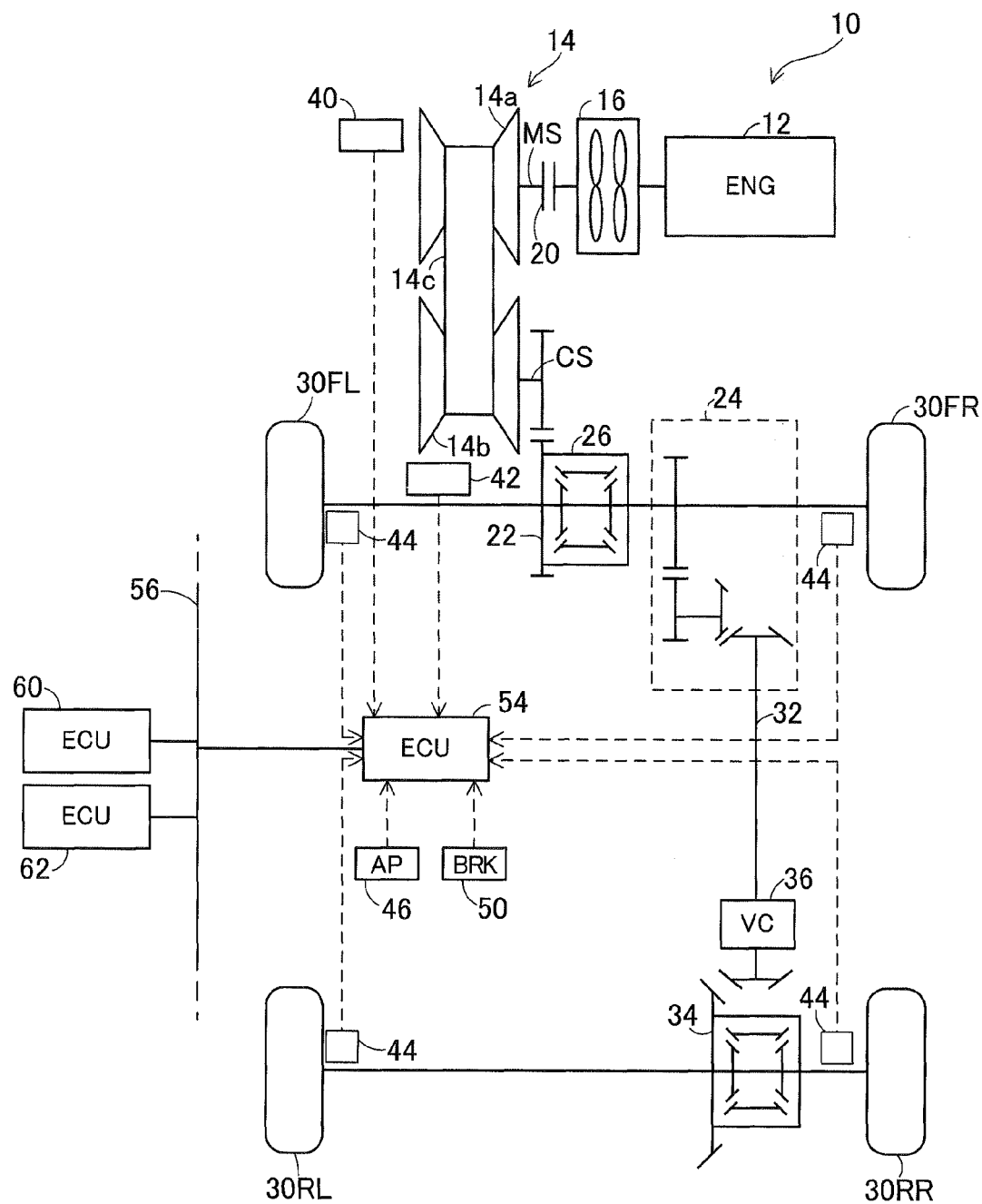
FIG. 1 is an overall view schematically showing a skid detection apparatus for a vehicle according to an embodiment of this invention.

FIG. 1 is an overall view schematically showing a skid detection apparatus for a vehicle according to an embodiment of this invention.

In FIG. 1, a symbol 10 designates a vehicle. The vehicle 10 is mounted with an internal combustion engine (prime mover; hereinafter called the "engine") 12 that is a gasoline-injected, water-cooled engine. An output of the engine 12 is inputted to a Continuous Variable Transmission (transmission mechanism; hereinafter called the "CVT") 14.

The CVT 14 comprises a drive pulley 14a installed at a main shaft MS, a driven pulley 14b installed at a countershaft CS, a metal belt 14c adapted to be wound (nm) around the pulleys, and a hydraulic mechanism (not shown) adapted to supply the operating oil to the belt 14c. The CVT 14 is inputted with an output of the engine 12 from the main shaft MS through a torque converter 16 and a forward clutch 20 and changes the engine output in speed with a continuously or steplessly controlled gear ratio.

The engine output after changed in speed by the CVT 14 is transmitted through the countershaft CS and a reduction gear 22 to a transfer (transfer case) 24 that distributes the engine output (transmitted by the CVT) to a front wheel side and rear wheel side.

The output for the front wheel side is transferred to the front wheels 30FL, 30FR through a front differential mechanism 26. The output for the rear wheel side is transferred from the transfer 24 to the rear wheels 30RL, 30RR through a propeller shaft 32 and a rear differential mechanism 34. Thus, the vehicle 10 is configured as a four-wheel drive type vehicle that changes the output of the engine 12 in speed by the CVT 14 and transmits the engine output to the front and rear wheels 30FL, 30FR, 30RL, 30RR to drive them.

A Viscous Coupling (hereinafter called the "VC") 36 is interposed at the propeller shaft 32. The VC 36 comprises a number of clutch plates housed in its case and silicon oil (fluid) of high viscosity is sealed therein. The VC 36 transfers power using the shear force generated by rotation difference between the plates.

An NDR sensor 40 installed near the drive pulley 14a of the CVT 14 produces an output or signal corresponding to input (drive side) rotational speed of the CVT 14, while an NDN sensor 42 installed near the driven pulley 14b produces an output or signal corresponding to output (driven side) rotational speed of the CVT 14.

Wheel speed sensors 44 are installed near each driveshaft (not shown) of the right and left front wheels 30FL, 30FR and that of the right and left rear wheels 30RL, 30RR and each of the sensors 44 produces an output or signal indicative of rotational speed (wheel speed) of the associated wheel 30FL, 30FR, 30RL or 30RR.

An accelerator position sensor 46 is installed near an accelerator pedal (not shown) provided on the floor near the operator's (driver's) seat of the vehicle 10 and produces an output or signal indicative of accelerator position or opening AP (an amount of operator's depression of the accelerator pedal). A brake (BRK) switch 50 installed near a brake pedal (not shown) produces an ON signal upon manipulation of the brake pedal by the operator.

The outputs of the sensors and switch are sent to an Electronic Control Unit (ECU) 54 that has a microcomputer including a CPU, ROM, EEPROM, RAM, input/output circuits, and other components. The ECU 54 controls the operation of the CVT 14.

The ECU 54 is connected with a second ECU 60 that controls the operation of the engine 12 through a CAN (controller area network) 56, with a third ECU 62 that conducts traction control, anti-skid control, etc, and with other devices.

Next, the operation of the apparatus according to this embodiment will be explained.

Figure 2:
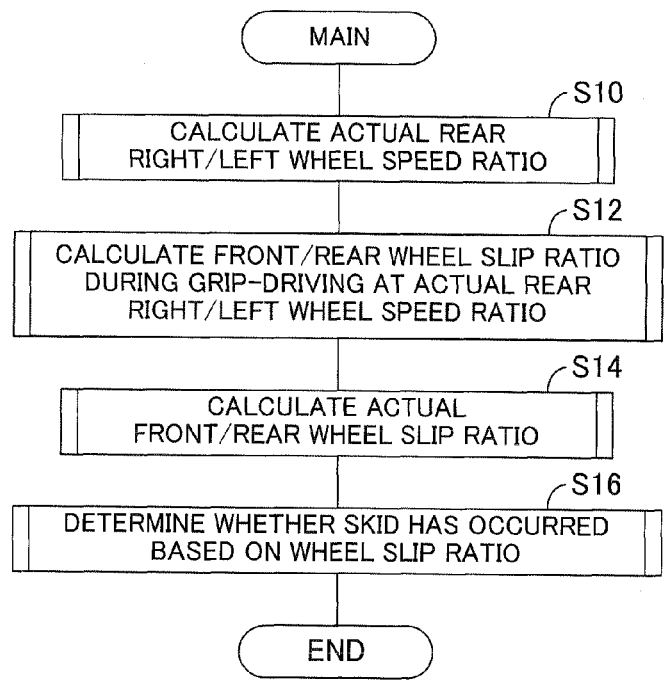
FIG. 2 is a flowchart showing the operation of an electronic control unit shown in FIG. 1.

FIG. 2 is a flowchart showing the operation, which is executed by the ECU 54 at predetermined intervals.

The program begins at S10, in which an actual rear right/left wheel speed ratio is calculated.

Figure 3:
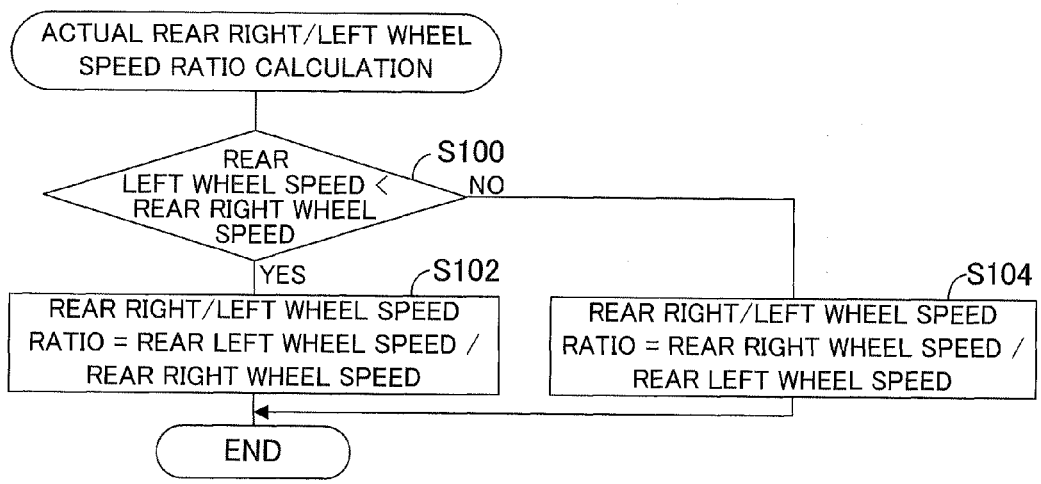
FIG. 3 is a subroutine flowchart showing the processing for calculating an actual rear right/left wheel speed ratio of the FIG. 2 flowchart.

FIG. 3 is a subroutine flowchart showing the calculation processing. In S100, it is determined whether rear right wheel speed is greater than rear left wheel speed, i.e., whether the rear wheel 30RR is greater in the rotational speed detected by the wheel speed sensor 44 than the rear wheel 30RL.

When the result in S100 is affirmative, the program proceeds to S102, in which a quotient obtained by dividing the rear left wheel speed by the rear right wheel speed is determined or set to the (actual) rear right/left wheel speed ratio. When the result is negative, the program proceeds to S104, in which a quotient obtained by dividing the rear right wheel speed by the rear left wheel speed is determined or set to the (actual) rear right/left wheel speed ratio.

Returning to the explanation on FIG. 2, the program proceeds to S12, in which a front/rear wheel slip ratio during grip-driving at the actual rear right/left wheel speed ratio is calculated.

Figure 4:
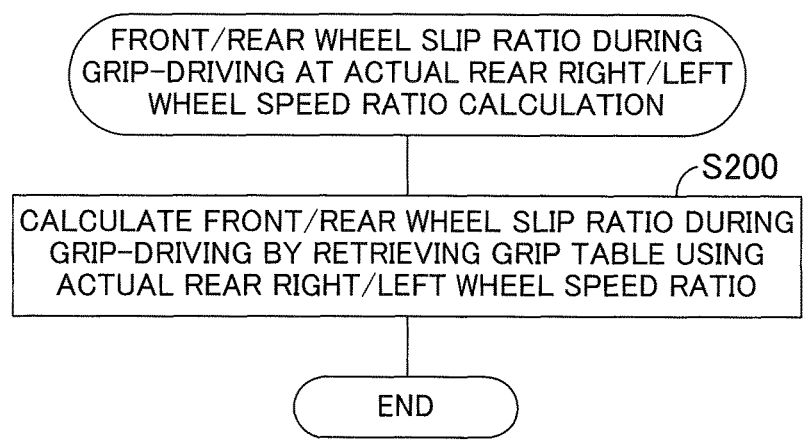
FIG. 4 is a subroutine flowchart showing the processing for calculating a front/rear wheel slip ratio during grip-driving at the actual rear right/left wheel speed ratio.

FIG. 4 is a subroutine flowchart showing the calculation processing.

Before explaining FIG. 4, the relationship between a rear right/left wheel speed ratio and the front/rear wheel slip ratio during grip-driving will be explained with reference to FIGS. 5 and 6.

Figure 5:
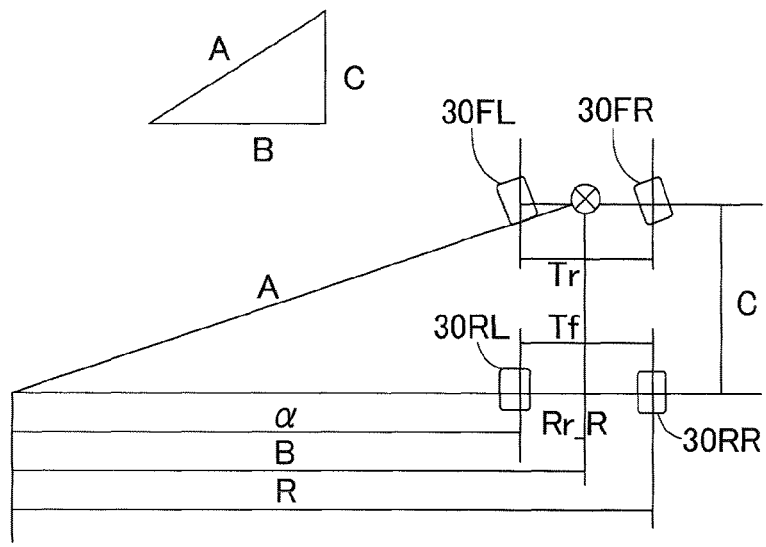
FIG. 5 is an explanatory view for explaining the processing of FIG. 4 by showing the relationship between a rear right/left wheel speed ratio and the front/rear wheel slip ratio during grip-driving.
Figure 6:
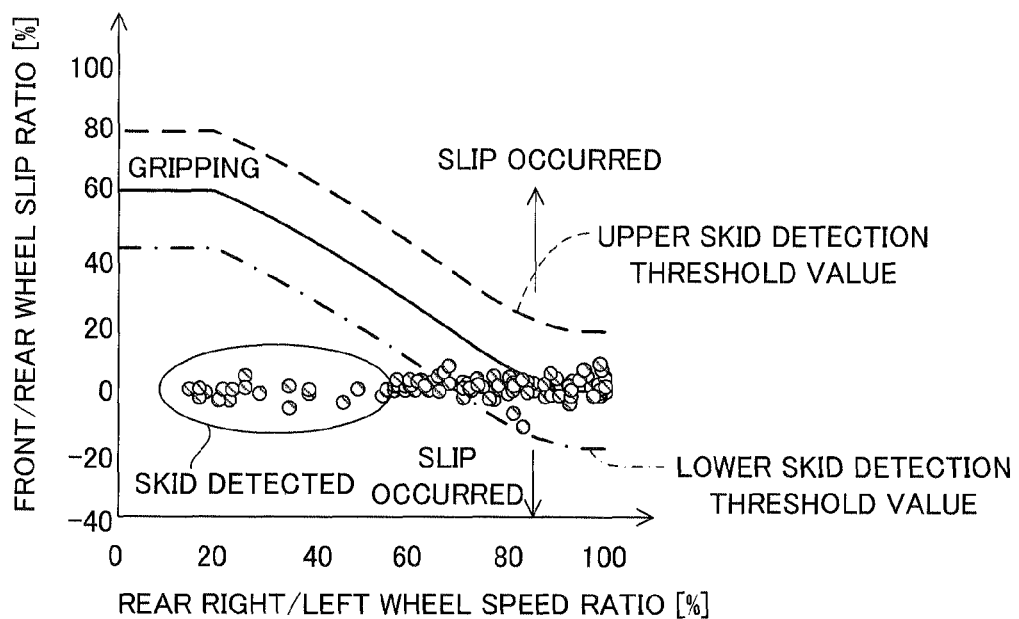
FIG. 6 is an explanatory view showing the characteristics of the front/rear wheel slip ratio with respect to the rear right/left wheel speed ratio during grip-driving, which is calculated based on the relationship shown in FIG. 5 and stored beforehand.

As shown in FIG. 5, based on the relationship between the center of turning and wheels, the relationship between the rear right/left wheel speed ratio and front/rear wheel slip ratio during grip-driving can be expressed as $B^2+C^2=A^2$, and based thereon, as shown in FIG. 6, the front/rear wheel slip ratio with respect to the rear right/left wheel speed ratio during grip-driving can be obtained.

FIG. 6 is a view of table characteristics (obtained in advance and stored (prepared) in the ROM) by calculating the front/rear wheel slip ratio with respect to the rear right/left wheel speed ratio during grip-driving (based on the assumption that both the front and rear wheels grip the road), i.e., in the ideal condition, such that the front/rear wheel slip ratio during grip-driving (in the ideal condition) is retrieved (or calculated) by using the actual rear right/left wheel speed ratio calculated from a detected value as address data.

As illustrated, in the characteristics, the skid detection threshold values are set to be constant when the rear right/left wheel speed ratio is smaller than a prescribed value (e.g., 20%) and decrease as the rear right/left wheel speed ratio increases.

Based on the foregoing premise, the explanation on FIG. 4 is resumed. In S200, the front/rear wheel slip ratio during grip-driving is calculated by retrieving the characteristics of FIG. 6 using the actual rear right/left wheel speed ratio calculated in S102 or S104 as the address data.

Returning to the explanation on FIG. 2, the program proceeds to S14, in which an actual front/rear wheel slip ratio is calculated.

Figure 7:
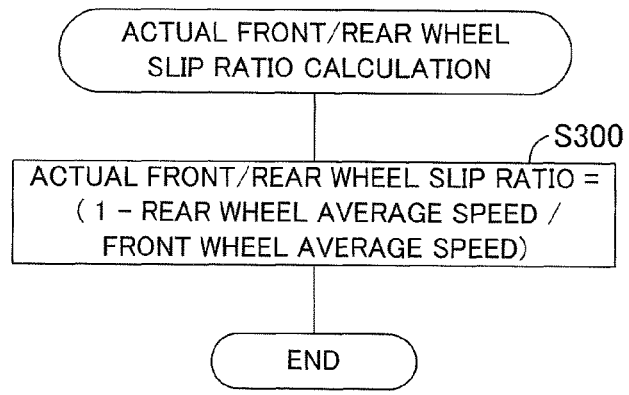
FIG. 7 is a subroutine flowchart showing the processing for calculating an actual front/rear wheel slip ratio shown in the FIG. 2 flowchart.

FIG. 7 is a subroutine flowchart showing the calculation processing. In S300, a ratio of rear wheel average speed to front wheel average speed, i.e., a ratio of average rotational speed of the wheels 30RL, 30RR to that of the wheels 30FL, 30FR, is calculated and a difference obtained by subtracting the calculation result from 1.0 is determined or set to the actual front/rear wheel slip ratio.

Returning to the explanation on FIG. 2, the program proceeds to S16, in which, based on the wheel slip ratio, it is determined whether a skid has occurred.

Figure 8:
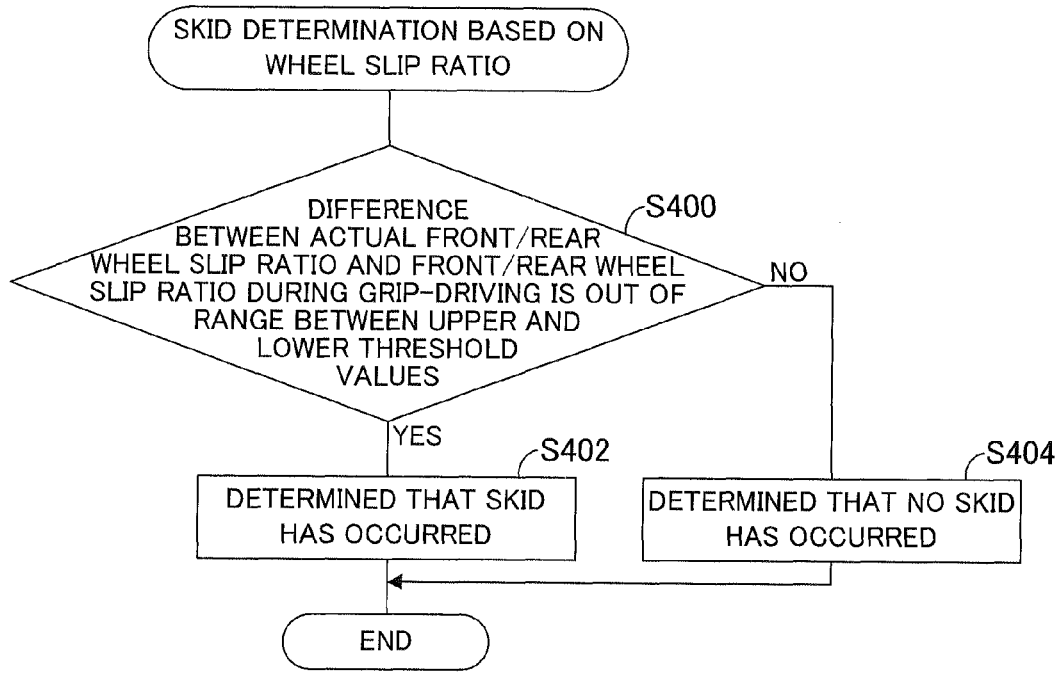
FIG. 8 is a subroutine flowchart showing the processing of skid detection at a wheel slip ratio shown in the FIG. 2 flowchart.

FIG. 8 is a subroutine flowchart showing the processing.

In S400, a difference between the actual front/rear wheel slip ratio calculated in S300 and the front/rear wheel slip ratio during grip-driving calculated by retrieving the characteristics of FIG. 6 in S200, is obtained and it is determined whether the obtained difference is out of a range defined by skid detection threshold values. Specifically, the difference is out of the range between the upper and lower skid detection threshold values, more specifically, it is greater than an upper skid detection threshold value or it is smaller than a lower skid detection value, as shown in FIG. 6.

When the result in S400 is affirmative, specifically, when it is determined that the difference is not within the range between the upper and lower skid detection values, in other words when the difference is greater than the upper threshold value upwardly or is smaller than the lower threshold value, the program proceeds to S402, in which it is determined that a skid has occurred.

On the other hand, when the result is negative, specifically, when it is determined that the difference is within the range between the upper and lower skid detection values, the program proceeds to S404, in which it is determined that no skid has occurred (a skid does not occur).

As stated above, the embodiment is configured to have an apparatus for and method of detecting a skid occurred on a vehicle (10) having a prime mover (12) and a transmission (14) that changes an output of the prime mover in speed and transmits the output to front right/left wheels (30FR, 30FL) and rear right/left wheels (30RR, 30RL) to drive them, comprising: a front/rear wheel rotational speed detector (44) that detects each rotational speed of the front wheels and that of the rear wheels; an actual rear right/left wheel speed ratio calculator (ECU 54, S10, S100-S104) that calculates an actual rear right/left wheel speed ratio between the rear right/left wheel speeds based on the detected front wheel rotational speed and the rear wheel rotational speed; a grip-driving front/rear wheel slip ratio calculator (ECU 54, S12, S200) that calculates a front/rear wheel slip ratio during grip-driving by retrieving characteristics of a front/rear wheel slip ratio set with respect to a rear right/left wheel speed ratio using the calculated actual rear right/left wheel speed ratio, which characteristics are calculated and prepared in advance based on assumption that the front and rear wheels grip a road; an actual front/rear wheel slip ratio calculator (ECU 54, S14, 5300) that calculates an actual front/rear wheel slip ratio based on the detected front wheel rotational speed and the rear wheel rotational speed; and a skid determiner (ECU 54, S16, S400-S404) that determines that a skid has occurred based on a difference between the calculated front/rear wheel slip ratio during grip-driving and the calculated actual front/rear wheel slip ratio.

Thus, the skid detection is conducted not by using a difference between average speed of front wheels and that of rear wheels, but by obtaining the characteristics (as shown in FIG. 6) prepared in advance by calculating the front/rear wheel slip ratio set with respect to the rear right/left wheel speed ratio during grip-driving (i.e., when the front and rear wheels 30FL, 30FR, 30RL, 30RR grip the road in the ideal condition), retrieving the characteristics using the actual rear right/left wheel speed ratio calculated from a detected value to calculate the front/rear wheel slip ratio during grip-driving (in the ideal condition), and detecting whether or not a skid has occurred based on a difference between the front/rear wheel slip ratio during grip-driving and the actual front/rear wheel slip ratio calculated from the detected value.

With this, it becomes possible to accurately detect a skid occurred on the four-wheel drive vehicle 10. Accordingly, when the vehicle 10 is equipped with the CVT 14, since the pulley clamping pressure of the belt 14c can be increased upon occurrence of a skid, it becomes possible to avoid slippage of the belt 14c which may happen when, for example, a skid occurs on a low-friction road while driving and the vehicle is escaped therefrom to a high-friction road under the skid condition so that the wheels abruptly grip the road.

In the apparatus and method, the skid determiner determines that the skid has occurred when the difference is out of a range defined by skid detection threshold values (S400-S402).

In the apparatus and method, the skid detection threshold values are set to decrease as the rear right/left wheel speed ratio increases and the skid detection threshold values are set to be constant when the rear right/left wheel speed ratio is smaller than a prescribed value.

In the apparatus and method, the vehicle (10) comprises a four-wheel drive vehicle equipped with a transfer (24) that distributes the output transmitted by the transmission to the front wheels and rear wheels, a propeller shaft (32) that connects the transfer to a rear differential mechanism (34), and a viscosity coupling (36) interposed at the propeller shaft to generate power to be transmitted to the rear wheels, and the prime mover comprises an internal combustion engine (10). With this, it becomes possible to detect a skid further accurately.

It should be noted that, in the foregoing embodiment, although the four-wheel drive vehicle is exemplified, this invention can also be applied to a two-wheel drive vehicle. Further, although the CVT is taken as an example of a transmission, this invention is applicable to any four-wheel drive (or two-wheel drive) vehicle having an automatic transmission that allows few different distinct gear ratios to be selected.

Japanese Patent Application No. 2009-251085 filed on Oct. 30, 2009 is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for detecting a skid occurred on a vehicle having a prime mover and a transmission that changes an output of the prime mover in speed and transmits the output to front right/left wheels and rear right/left wheels to drive them, comprising:
   a front/rear wheel rotational speed detector that detects each rotational speed of the front wheels and that of the rear wheels;
   an actual rear right/left wheel speed ratio calculator that calculates an actual rear right/left wheel speed ratio between the rear right/left wheel speeds based on the detected front wheel rotational speed and the rear wheel rotational speed;
   a grip-driving front/rear wheel slip ratio calculator that calculates a front/rear wheel slip ratio during grip-driving by retrieving characteristics of a front/rear wheel slip ratio set with respect to a rear right/left wheel speed ratio using the calculated actual rear right/left wheel speed ratio, which characteristics are calculated and prepared in advance based on assumption that the front and rear wheels grip a road;
   an actual front/rear wheel slip ratio calculator that calculates an actual front/rear wheel slip ratio based on the detected front wheel rotational speed and the rear wheel rotational speed; and
   a skid determiner that determines that a skid has occurred based on a difference between the calculated front/rear wheel slip ratio during grip-driving and the calculated actual front/rear wheel slip ratio,
   wherein the skid determiner determines that the skid has occurred when the difference is out of a range defined by skid detection threshold values.

2. The apparatus according to claim 1, wherein the skid detection threshold values are set to decrease as the rear right/left wheel speed ratio increases.

3. The apparatus according to claim 2, wherein the skid detection threshold values are set to be constant when the rear right/left wheel speed ratio is smaller than a prescribed value.

4. The apparatus according to claim 1, wherein the vehicle comprises a four-wheel drive vehicle equipped with a transfer that distributes the output transmitted by the transmission to the front wheels and rear wheels, a propeller shaft that connects the transfer to a rear differential mechanism, and a viscous coupling interposed at the propeller shaft to generate power to be transmitted to the rear wheels.

5. The apparatus according to claim 4, wherein the prime mover comprises an internal combustion engine.

6. A method of detecting a skid occurred on a vehicle having a prime mover and a transmission that changes an output of the prime mover in speed and transmits the output to front right/left wheels and rear right/left wheels to drive them, comprising the steps of:

debug detecting each rotational speed of the front wheels and that of the rear wheels;

calculating an actual rear right/left wheel speed ratio between the rear right/left wheel speeds based on the detected front wheel rotational speed and the rear wheel rotational speed;

calculating a front/rear wheel slip ratio during grip-driving by retrieving characteristics of a front/rear wheel slip ratio set with respect to a rear right/left wheel speed ratio using the calculated actual rear right/left wheel speed ratio, which characteristics are calculated and prepared in advance based on assumption that the front and rear wheels grip a road;

calculating an actual front/rear wheel slip ratio based on the detected front wheel rotational speed and the rear wheel rotational speed; and determining that a skid has occurred based on a difference between the calculated front/rear wheel slip ratio during grip-driving and the calculated actual front/rear wheel slip ratio, wherein the step of skid determining determines that the skid has occurred when the difference is out of a range defined by skid detection threshold values.

7. The method according to claim 6, wherein the skid detection threshold values are set to decrease as the rear right/left wheel speed ratio increases.

8. The method according to claim 7, wherein the skid detection threshold values are set to be constant when the rear right/left wheel speed ratio is smaller than a prescribed value.

9. The method according to claim 6, wherein the vehicle comprises a four-wheel drive vehicle equipped with a transfer that distributes the output transmitted by the transmission to the front wheels and rear wheels, a propeller shaft that connects the transfer to a rear differential mechanism, and a viscous coupling interposed at the propeller shaft to generate power to be transmitted to the rear wheels.

10. The method according to claim 9, wherein the prime mover comprises an internal combustion engine.

* * * * *